United States Patent [19]

Fox

[11] Patent Number: 5,073,724
[45] Date of Patent: Dec. 17, 1991

[54] PROGRAMMABLE INVERSE TIME DELAY CIRCUIT

[75] Inventor: David A. Fox, Shawnee Township, Allen County, Ohio

[73] Assignee: Westinghouse Electric Corp., Pittsburgh, Pa.

[21] Appl. No.: 553,508

[22] Filed: Jul. 18, 1990

[51] Int. Cl.$^5$ .................. H03K 5/24; H03K 17/08; H03K 17/28

[52] U.S. Cl. .................... 307/360; 307/362; 307/597; 307/608; 340/662; 361/79; 361/89; 361/91

[58] Field of Search .............. 307/354, 360, 362, 597, 307/608, 350; 361/79, 89, 91, 93; 340/661, 662, 664

[56] References Cited

U.S. PATENT DOCUMENTS

| | | | |
|---|---|---|---|
| 3,697,780 | 10/1972 | Michael et al. | 307/360 |
| 3,697,813 | 10/1972 | Fox | 317/36 |
| 4,187,438 | 2/1980 | Müeller | 307/362 |
| 4,245,184 | 1/1981 | Billings et al. | 323/9 |
| 4,345,288 | 8/1982 | Kampf et al. | 361/31 |
| 4,347,541 | 8/1982 | Chen et al. | 361/650 |
| 4,363,064 | 12/1982 | Billings et al. | 361/57 |
| 4,368,500 | 1/1983 | Conroy, Jr. et al. | 361/94 |
| 4,404,473 | 9/1983 | Fox | 307/125 |
| 4,438,476 | 3/1984 | Breen | 361/96 |
| 4,476,511 | 10/1984 | Saletta et al. | 361/96 |
| 4,513,342 | 4/1985 | Rocha | 307/94 |
| 4,571,659 | 2/1986 | Demeyer et al. | 361/95 |
| 4,814,935 | 3/1989 | Arinobu et al. | 361/96 |

Primary Examiner—John Zazworsky
Attorney, Agent, or Firm—R. P. Lenart

[57] ABSTRACT

An inverse time delay circuit includes an integrator for receiving a signal representative of a voltage or current in an external circuit and a reference signal. The integrator produces a control signal representative of the integral of the difference between the signals. A comparator compares the control signal to a second reference signal to produce an output which changes logic states when the magnitude of the control signals exceeds the magnitude of the second reference signal. A circuit is provided to control the magnitudes of one or both of the reference signals thereby providing control of the instantaneous and/or ultimate trip levels of the circuit.

4 Claims, 2 Drawing Sheets

PROGRAMMABLE INVERSE TIME DELAY CIRCUIT

BACKGROUND OF THE INVENTION

This invention relates to a protection circuit for electrical and electronic systems and, more particularly, to an inverse time delay circuit for detecting an overcurrent or overvoltage fault condition to protect a power switching device.

Electric power systems, such as single or multiple phase AC or DC voltage systems, are required to be operated over a range of conditions limited by the current handling capacity of the wiring and loads. Protective devices such as solid state power controllers are required to sense overcurrent or overvoltage conditions in the systems and to operate to provide any required isolation or reconnection of the various system components.

Such protective devices may include a trip circuit which controls the operation of a switching device in response to a sensed overvoltage or overcurrent condition and includes an inverse time delay circuit that provides a trip time versus input given by the Equation:

$$T = \frac{A(B - X)}{X - C} \quad (1)$$

where T is the trip time of the circuit; X is the magnitude of an input signal representative of voltage or current; and A, B and C are constants. An inverse trip circuit which provides a trip time in accordance with the Equation (1) is illustrated in U.S. Pat. No. 3,697,813, issued Oct. 10, 1972. The constant B, which may be a first reference voltage level in the circuit, defines the instantaneous trip time of the circuit and the constant C, which may be a second reference voltage level, defines the ultimate trip time, where the trip time approaches infinity. The constant A is a scaling factor which adjusts the spacing between the instantaneous trip time and the ultimate trip time.

An additional trip circuit which provides a trip time in accordance with Equation (1) is illustrated in block 38 of FIG. 2 of U.S. Pat. No. 4,245,184, issued Jan. 13, 1981. That circuit includes a noninverting integrator which receives a signal representative of an overload condition and also receives a reference signal to produce a control signal that is proportional to the integral of the difference between the overcurrent signal and the reference signal. This control signal is compared to an additional reference signal to produce a trip signal which changes logic state when the magnitude of the control signal exceeds the magnitude of the second reference signal.

Such circuits provide the desired inverse time delay trip signal but are designed to address a single set of operating parameters. Therefore, a large number of such circuits must be provided to address various operating specifications. It would be desirable to devise an inverse time delay trip circuit which is capable of satisfactory operation over a range of operating conditions to reduce the required inventory of such circuits.

SUMMARY OF THE INVENTION

Inverse time delay circuits constructed in accordance with this invention include an integrator having a first input for receiving a signal representative of a voltage or current in an external circuit and having a second input for receiving a reference signal, such that the integrator produces a control signal representative of the integral of the difference of the signals at the first and second inputs. A comparator is connected to receive the control signal and to compare it with a second reference signal to produce an output signal which changes logic states when the magnitude of the control signal exceeds the magnitude of the second reference signal. A programmable device is provided to control the magnitudes of either the first reference signal, the second reference signal, or both reference signals so that the instantaneous trip time, the ultimate trip time, or both trip times can be controlled either together or independently to provide an inverse time delay circuit that is capable conditions.

BRIEF DESCRIPTION OF THE DRAWINGS

The invention will become more readily apparent from the following description of the preferred embodiments thereof, shown in the accompanying drawings wherein: alternative embodiments of the present invention.

DESCRIPTION OF THE PREFERRED EMBODIMENTS

Figure 1:
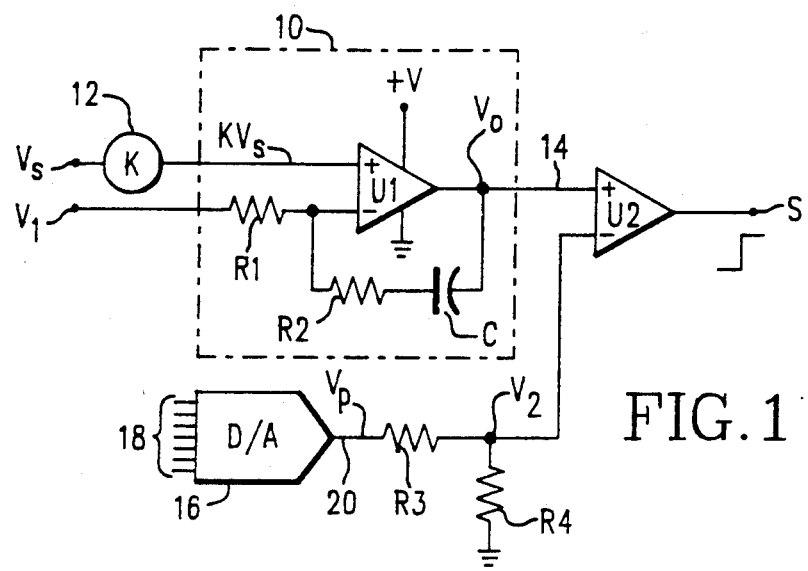
FIGS. 1, 2 and 3 are schematic diagrams of alternative embodiments of the present invention.

Referring to the drawings, FIG. 1 is a schematic diagram of one embodiment of an inverse time delay circuit constructed in accordance with the present invention. The circuit includes an integrator 10 comprising operational amplifier U1, capacitor C, and resistors R1 and R2. A signal $V_s$ representative of a voltage or current signal in an external circuit is multiplied by a scaling factor K by a scaling circuit 12 and connected to the noninverting input of operational amplifier U1. A first reference signal $V_1$ is supplied to the inverting input of amplifier U1. This results in a control signal on line 14 which is representative of the integral of the difference between the signals at the inverting and noninverting inputs of the operational amplifier U1. A comparator U2 receives the control signal on line 14 and compares it to a second reference signal $V_2$ to produce an output signal $S_o$ which goes from a logic low to a logic high level when the magnitude of the control signal exceeds the magnitude of the second reference signal. The circuit of FIG. 1 provides a change in logic state of the output signal $S_o$ at a trip time T in accordance with Equation (1) above. The constants A, B and C of Equation (1) can now be determined in accordance with the parameters of the circuit of FIG. 1 as follows. At the instant trip level, where $X = B = KV_s$:

$$V_o = (KV_s - V_1)\left(1 + \frac{R2}{R1}\right) = V_2 \quad (2)$$

$$(KV_s - V_1) = \frac{V_2}{\left(1 + \frac{R2}{R1}\right)} \quad (3)$$

$$KV_s = \frac{V_2 R1}{R1 + R2} + V_1 \quad (4)$$

$$V_s = \frac{1}{K}\left(\frac{V_2 R1}{(R1 + R2)} + V_1\right) \qquad (5)$$

At the ultimate trip level, when $X = C$:

$$KC = V_1 \qquad (6)$$

$$C = \frac{V_1}{K} \qquad (7)$$

Equations (5) and (7) can be used to design or analyze the circuit of FIG. 1. An analysis of these equations shows that the instantaneous trip level is controlled by the magnitude of the second reference signal $V_2$. A digital-to-analog converter 16 is used to provide the ability to program the magnitude of signal $V_2$ by receiving a digital command signal on lines 18 to produce a programmed reference voltage $V_p$ on line 20. This programmed reference voltage is delivered to a resistive voltage divider comprising resistors R3 and R4 such that reference signal $V_2$ is produced at the junction point between resistor R3 and R4. The R3, R4 voltage divider matches the typical 0-10 volt range of the digital-to-analog converter to the required range of $V_2$ values.

Figure 2:
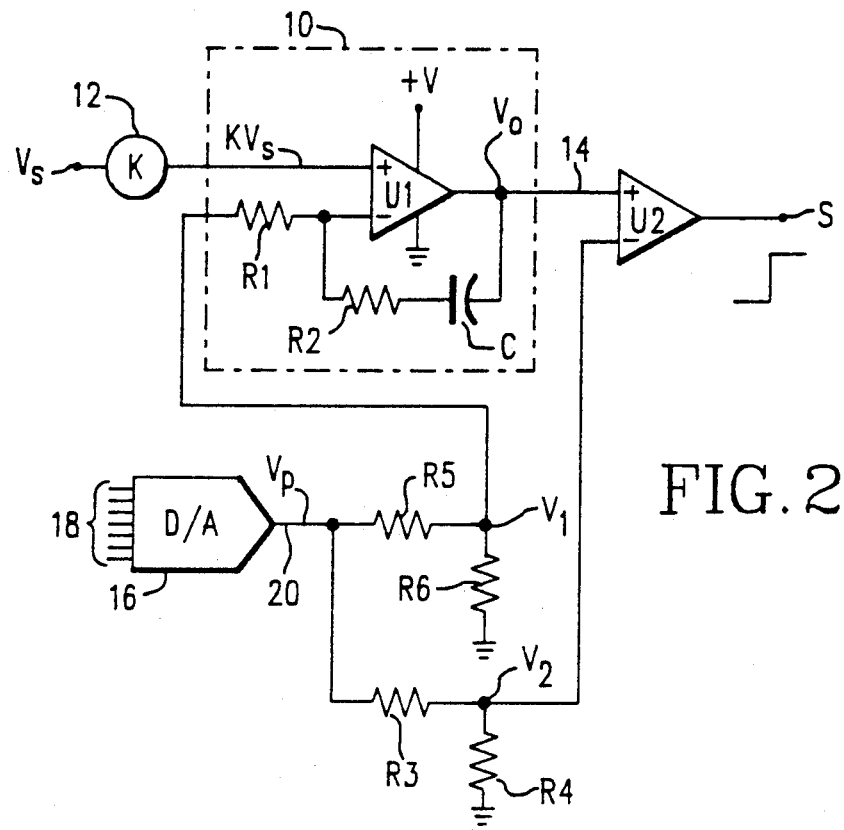

FIG. 2 is a schematic diagram of an alternative embodiment of the invention wherein both the instantaneous trip and ultimate trip levels are programmable. This is accomplished by adding a second resistive voltage divider comprising the series connection of resistors R5 and R6 such that the first reference voltage signal V1 appears at the junction point between resistors R5 and R6. Equations (5) and (7) show that constants B and C will change together if $V_1$ and $V_2$ are both made proportional to $V_p$.

Figure 3:
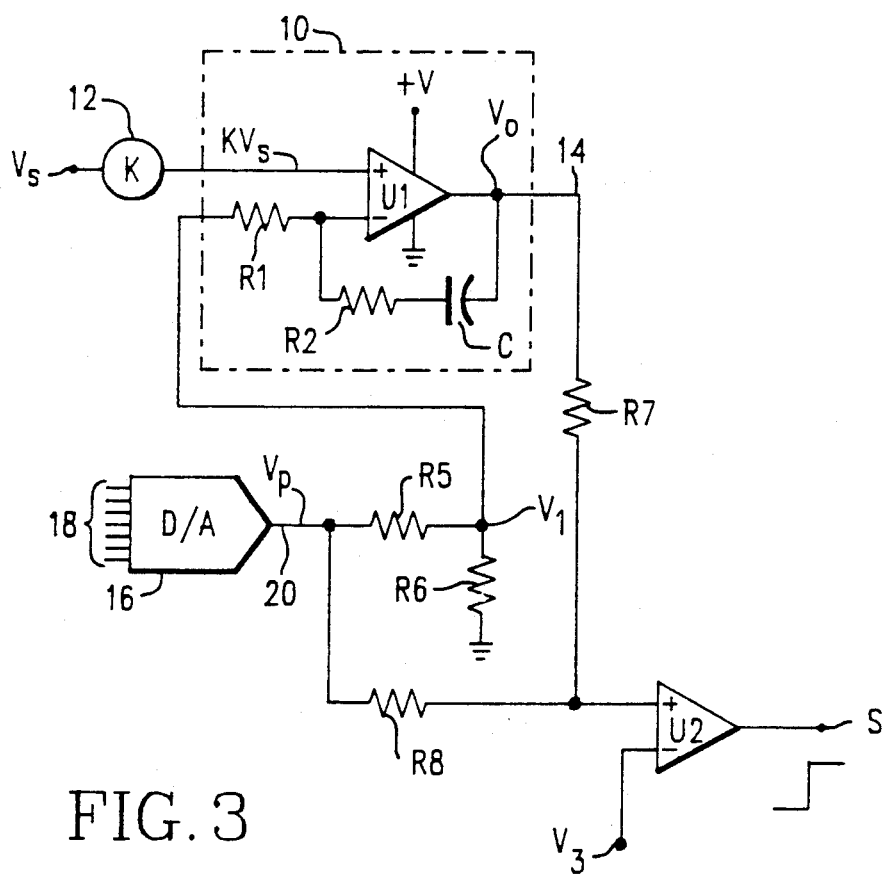

FIG. 3 is a schematic diagram of another embodiment of the present invention in which the ultimate trip level C is programmable. This is accomplished by adding resistor R7 between the output of integrator 10 and the noninverting input of comparator U2, and by adding a resistor R8 between the output of the digital-to-analog converter 16 and the noninverting input of comparator U2. A reference voltage $V_3$ is supplied to the inverting input of comparator U2. From Equation (5), it can be seen that changing the value of the reference signal $V_1$ also changes the value of constant B. If changing B is not desirable, the second reference signal $V_2$ must be modified by $V_p$ to make the instantaneous trip level B independent of the change in $V_p$, and thus independent of the change in constant C. In the circuit of FIG. 3, the values of resistors R7 and R8 are chosen to make the instantaneous trip level independent of the magnitude of the programmed voltage $V_p$. The required ratio of resistors R7 and R8 is found by:

$$\frac{R7}{R8} = \rho\left(1 + \frac{R2}{R1}\right) \qquad (8)$$

where the $\rho$ is the ratio of $V_1$ to $V_p$. Then, $V_3$ is found by the Equation:

$$V_3 = \frac{V_2 R8 + V_p R7}{(R7 + R8)} \qquad (9)$$

where $V_2$ is the reference value assumed in the design of the circuit of FIG. 1.

Figure 4:
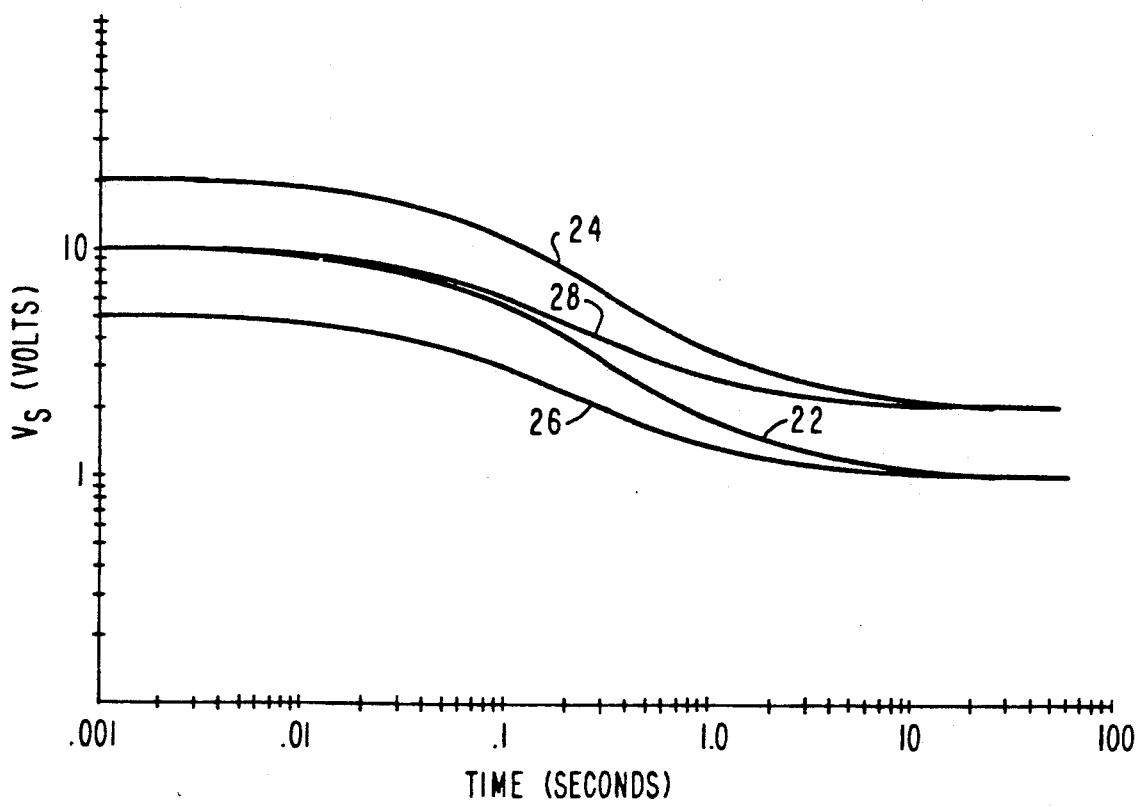
FIG. 4 is a series of curves which illustrate the operation of the circuits of FIGS. 1, 2 and 3.

FIG. 4 is a series of curves which illustrate the programmable capabilities of the circuits of FIGS. 1, 2 and 3. Curve 22 shows an operating characteristic for the circuit of FIG. 1 if $V_2$ is a preselected fixed value. Curve 24 shows the result of increasing the entire trip characteristic by a factor of 2. Both the ultimate trip and instant trip levels have been increased by the same amount. Curve 26 shows the result of decreasing the instantaneous trip level by a factor of 2. The ultimate trip level remains unchanged. Curve 28 shows the results of increasing the ultimate trip level by a factor of 2 while maintaining the original instant trip level.

The results illustrated by the curves of FIG. 4 show that complete flexibility in programming the trip characteristic is available if the described techniques are used. Inverse time delay trip circuits constructed in accordance with this invention provide programmable trip characteristics by using programmable reference voltage levels. The ultimate trip and instant trip levels may be programmed independently, and the required circuit component values can be easily calculated.

Although the present invention has been shown in terms of what are at present believed to be its preferred embodiments, it will be apparent to those skilled in the art that various changes may be made without departing from the scope of the invention. For example, although a digital-to-analog converter is shown to provide the programmable voltage reference level $V_p$, an analog circuit which adjusts the voltage level $V_p$ may be used in place of the digital-to-analog converter. It is therefore intended that the appended claims cover such changes.

What is claimed is:

1. An inverse time delay circuit comprising:
    an integrator having a first input for receiving a signal representative of a voltage or current signal in an external circuit and having a second input for receiving a first reference signal, said integrator producing a control signal representative of the integral of the difference of the signals at said first and second inputs;
    a comparator having a first input connected to receive said control signal and having a second input connected to receive a second reference signal, said comparator producing an output signal which changes logic states when the magnitude of said control signal exceeds the magnitude of said second reference signal; and
    means for programming said magnitude of said second reference signal in response to a command signal, wherein said means for programming the magnitude of said second reference signal includes: a digital-to-analog converter for receiving said command signal and for producing a first programmed reference voltage; and a first voltage divider including first and second resistors electrically connected in series with each other, said first resistor being connected to receive said first programmed reference voltage such that said second reference signal is produced at a junction point between said first and second resistors.

2. An inverse time delay circuit as recited in claim 1 further comprising:
    means for programming said magnitude of said first reference signal.

3. An inverse time delay circuit as recited in claim 2, wherein said means for programming the magnitude of said first reference signal includes:

a second voltage divider including third and fourth resistors electrically connected in series with each other, said third resistor being connected to receive said fist programmed reference voltage such that said first reference signal is produced at a junction point between said third and fourth resistors.

4. An inverse time delay circuit comprising:

an integrator having a first input for receiving a signal representative of a voltage or current signal in an external circuit and having a second input for receiving a fist reference signal, said integrator producing a control signal representative of the integral of the difference of the signals at said first and second inputs;

a comparator having a first input and having a second input connected to receive a second reference signal;

means for programming said magnitude of said first reference signal in response to a command signal, wherein said means for programming the magnitude of said first reference signal includes means for receiving said command signal and for producing a programmed reference voltage;

a first voltage divider including first and second resistors electrically connected in series with each other, a first end of said first voltage divider being connected to receive said programmed reference voltage and a second end of aid first voltage divider being connected to ground such that said first reference signal is produced at a junction point between said first and second resistors; and a second voltage divider including third and fourth resistors electrically connected in series with each other, a first end of said second voltage divider being connected to receive said programmed reference voltage, a second end of said second voltage divider being connected to receive said control signal, and a junction point between said third and fourth resistors being connected to said first input of said comparator.

* * * * *